E. C. SHAW.
VEHICLE WHEEL RIM.
APPLICATION FILED MAY 25, 1907.

1,240,888.

Patented Sept. 25, 1917.

WITNESSES:
Walter F. Thompson
Oliver Williams

INVENTOR
Edwin Copeland Shaw
BY Seward Davis
ATTORNEY

UNITED STATES PATENT OFFICE.

EDWIN COUPLAND SHAW, OF AKRON, OHIO, ASSIGNOR, BY MESNE ASSIGNMENTS, TO THE B. F. GOODRICH COMPANY, A CORPORATION OF NEW YORK.

VEHICLE-WHEEL RIM.

1,240,888.  Specification of Letters Patent.   Patented Sept. 25, 1917.

Application filed May 25, 1907. Serial No. 375,715.

*To all whom it may concern:*

Be it known that I, EDWIN COUPLAND SHAW, a citizen of the United States, and a resident of the city of Akron in the county of Summit and State of Ohio, have invented certain new and useful Improvements in Vehicle-Wheel Rims, of which the following is a specification, reference being had to the drawings forming a part thereof.

This invention relates to demountable rims for vehicle wheels, adapted to carry pneumatic tires. One of my objects is to fasten the rim securely to the felly and yet permit it to be readily demounted, and a further object is to so construct the rim that it may be easily and quickly engaged with and disengaged from the tire.

The invention is illustrated in connection with a rim of the general type disclosed in my Patent No. 971,318 of Sept. 27, 1910, embodying a transversely-split rim-body, base or ring, and endless bead-engaging rings or flanges, the said combination being claimed in the patent and not here claimed broadly, nor is the present invention wholly limited to a rim whose bead-engaging flanges (either or both) are endless and detachable from the rim base. It is further to be understood that the features of my present invention comprising, respectively, improvements in transversely-split rims, and improvements in rim-mounting devices may either be combined as here shown or used independently of each other. Various modifications may also be made in the illustrated structure embodying these respective improvements.

Various other changes may be made in the means for securing the detachable rim in place. It is also to be understood that my improvements in the means for attaching a removable tire-carrying rim to a wheel are of general application and may be used with an endless rim having either fixed or removable tire retaining flanges, as well as with the split form of rim shown.

Figure 1:
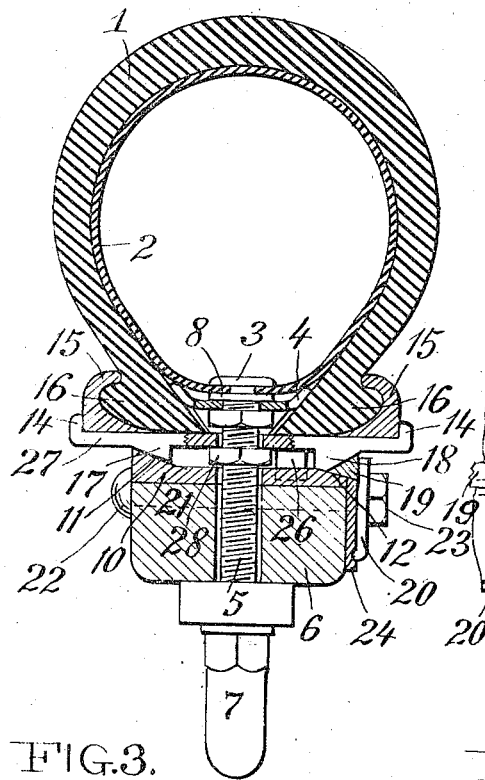
Figure 2:
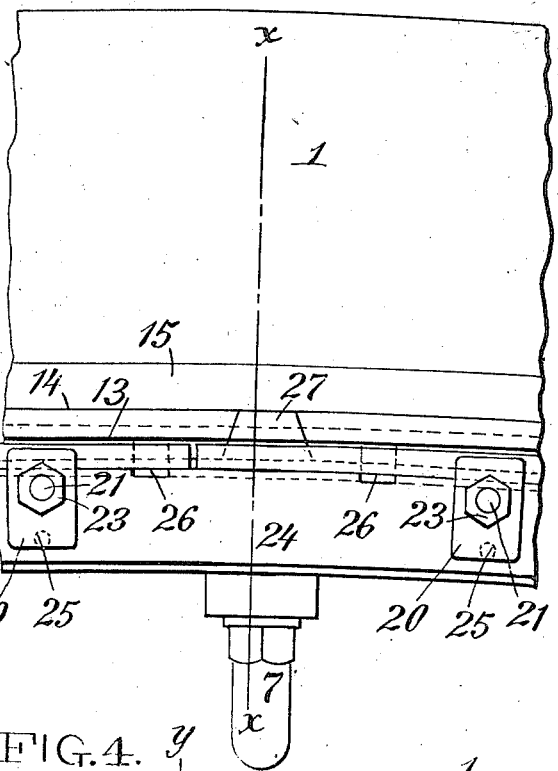

In the accompanying drawings which illustrate one embodiment of my invention, as applied to pneumatic tires of the clencher type, Figure 1 shows a section of a pneumatic tire on the line x—x of Fig. 2 applied to a removable split rim, of which the section is through its key-piece, attached to a permanent rim upon the wheel felly.

Figure 3:
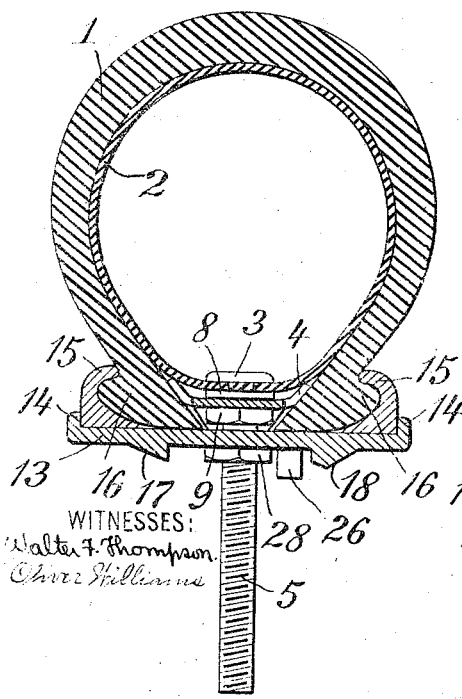
Figure 4:
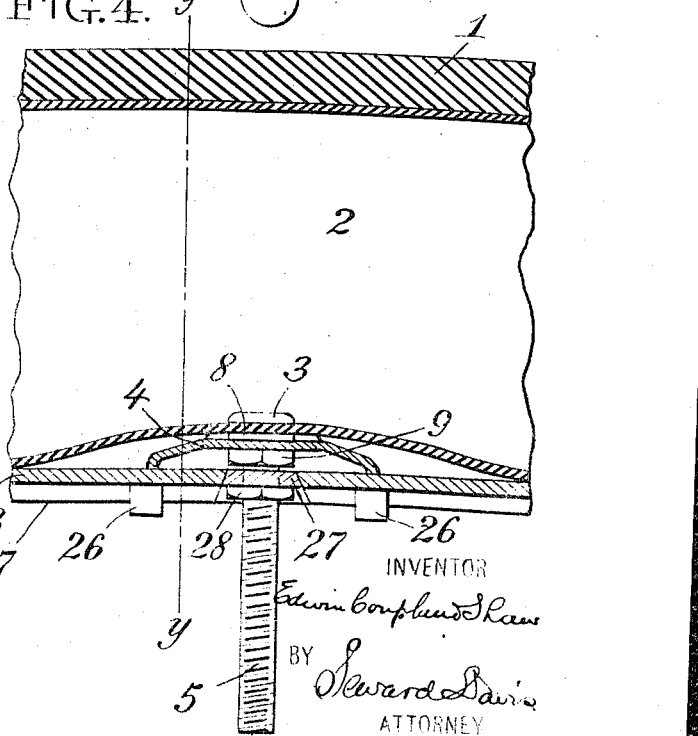

Fig. 2 is a side view in elevation of a portion of same, parts being shown in dotted outline. Fig. 3 shows in section on the line y—y of Fig. 4 the pneumatic tire and its rim and the valve-stem. Fig. 4 illustrates a sectional elevation of the parts shown in Fig. 3. Throughout these figures like reference numerals indicate the same or like parts.

1 is the outer tire or tire case, 2 the inner tube, 3 the head of the inflation tube, retaining the inner tube upon the saddle-washer or clip, 4, on the valve-stem, 5, which extends down through the felly 6 and which is terminated by the dust cap 7. The inner tube is held between the head 3 and a washer 8 above the clip 4 by the nut 9 upon the valve-stem as shown. To the felly 6 is attached a fixed or permanent metal rim 10 by screws or other suitable means. This rim 10 is shaped at one side into an upwardly inclined flange 11, and at its other side into a downward incline or taper 12; the faces of the inclines 11 and 12 being approximately parallel. The fixed rim 10, drilled to receive the valve-stem 5, supports a second and removable rim 13, whose sides are upturned in circumferential flanges 14, 14, within which and upon the removable rim 13 seat the detachable tire retaining flanges 15, 15. These are shown as adapted to the kind of tire here illustrated, that of the clencher type, in which the outer tire or tire case 1 is formed with beads 16, 16 fitting into the inwardly curved clenches of the retaining flanges 15. This tire-seating member 13, as shown in Fig. 2, is transversely split as at 27, to admit its being compressed that the retaining flanges 15 may be sprung over it, and to permit its expansion to the limit fixed by these continuous flanges 15 with which it contacts throughout. It is constructed with a key piece 27, adapted to enter between the opposed ends of the rim 13 and to wedge them apart and against the removable flanges 15, 15, by means of nut 28 on the valve-stem 5 pulling against the clip 4 which bears against the toes of the beads 16. This key-piece remains annexed to the demountable rim during the use of the latter, and is of such character as not to interfere, when in position, with the placing of said rim fully in operative location on the main rim or felly of the wheel. The key-piece 27 makes the removable rim continuous and enables the tire to be inflated thereupon and carried separately as a self-contained structure. This key-piece, as shown in Fig. 1, is identical in cross-section with the removable rim 13. The removable rim is further constructed with two downwardly projecting continuous flanges 17 and 18, both tapering outwardly, the latter having its lower edge chamfered and each being adapted to engage respectively with the outer faces of the inclines 11 and 12 of the fixed rim 10. 19 is a transversely split or broken locking ring, here shown of triangular cross-section, although it might have any other suitable sectional shape. 20 are keepers drilled to receive the bolts 21, which pass through the felly 6 and annular side plate 24; these bolts are each headed at 22 and screw threaded to receive the nuts 23, which clamp the keepers 20 to the plate 24, the keepers 20 having the bosses 25 engaged in sockets or depressions in the plate 24 to justify or aline them. The removable rim 13 also has one or more downwardly projecting lugs 26, seating in corresponding depressions in the fixed rim 10 to prevent circumferential movement of the former, or tendency to creep relatively to the fixed tire, removing the liability of strain upon its valve stem. These depressions are, transversely, slightly wider than the lugs, to admit of lateral motion in assembling.

The method of assembling is as follows: The retaining flanges 15, 15 being mounted upon the split removable rim 13, and the key-piece 27 being inserted and wedged into place by the screw-nut 28, the pneumatic tire 1 is inflated. The valve stem 5 is inserted through the fixed rim 10 and the felly 6, and the lugs 26 of the removable rim 13 contact with the fixed rim 10; the inclined faces of the flanges 17 and 18 come to rest upon the corresponding inclined faces 11 and 12 of the fixed rim 10 as soon as the lugs 26 seat themselves in their corresponding depressions, some lateral play being allowed both to the lugs 26 and the valve-stem. The locking ring 19 is then applied between the divergent faces of the tapered edges 12 and 18 of the fixed and removable rims respectively, and the bolt 21 is thrust through the keeper 20, and the nut 23 is next screwed up, forcing the keeper against the locking ring which, by its thrust, crowds the removable rim up the inclines 11 and 12 of the fixed rim, expanding the removable rim 13 as its flanges 17 and 18 mount their respective inclines and clamping it. The dust cap is then screwed up on the valve-stem. The locking ring 19, by reason of its relatively-narrow lateral section as shown, is locally deformable by the clamps or keepers 20 so as to become more tightly wedged at and immediately adjacent to the keepers than it is at points between and circumferentially remote from the latter. Thus the wedging angle may be made relatively great, as here represented, and the ring, by reason of its large angle and small contact surface, will not stick or rust in place, but is easily removable. At the same time it affords substantially a continuous rim support on one side and serves to distribute the pressure of the keepers 20 to circumferentially-adjacent points.

It is thus seen that the inflated tire may be carried upon the vehicle, already mounted upon its tire seating rim, and as thus ready for immediate service, may be quickly attached as a single self-contained structure to the wheel felly bearing the fixed or permanent rim. The bolted keeper prevents the removable rim from lateral displacement in one direction, while the wedging engagement of the inclined faces of the removable rim prevents lateral displacement in the opposite direction. The lugs 26 prevent circumferential motion. The tire rim is thus positively clamped against possibility of detachment under any and all stresses, while in turn the tire proper is held rigidly by the retaining flanges, which are held positively in position by the expansion of the removable rim. To remove the tire and its rim, the nuts 23, 23 are unscrewed and the keepers 20, 20 removed. The locking ring 19 is then taken off. The dust cap being next unscrewed, the rim side opposite the valve-stem may be slid off, permitting the removable rim to be lifted up, withdrawing the valve-stem and lugs 26 from the fixed rim.

Having thus described my invention, I claim:

1. In a wheel, in combination, a fixed wheel member, a demountable tire-carrying rim thereon having a transversely-split base, means for limiting the expansion of said base, and wedging means tending to expand said rim, for detachably securing it upon the fixed wheel member.

2. In a wheel, in combination, a fixed wheel member, a demountable tire-carrying rim thereon having a transversely split base and provided with means for limiting its expansion and contraction, and wedging means tending to expand said rim, for detachably securing it upon the fixed wheel member.

3. In a wheel, in combination, a fixed wheel member or felly, a demountable tire-carrying rim thereon, and a laterally-flexible wedging ring, together with felly bolts engaging said ring at intervals, for detachably holding said rim upon the fixed wheel member.

4. In a wheel, in combination, a fixed wheel member or felly, a transversely-split demountable tire-carrying rim thereon having means for limiting its expansion, a laterally-flexible split wedging ring and transverse felly bolts engaging said ring at intervals for detachably holding said rim upon the fixed wheel member.

5. In a vehicle wheel in combination, a fixed rim, a split detachable rim, removable annular tire retaining flanges and a locking ring for holding said rims in engagement.

6. In a vehicle wheel in combination, a fixed rim, a split detachable rim, removable annular tire retaining flanges, said detachable rim being contractible to release the flanges, and expansible to grip the flanges, and means for expanding said rim comprising a locking ring.

7. In a vehicle wheel, in combination, a fixed rim, a split detachable rim, removable annular tire retaining flanges, said detachable rim being contractible to release the flanges and expansible to grip the flanges, said two rims being formed with coacting inclined surfaces and means for wedging said surfaces together and expanding said split ring, said means comprising a locking ring and means for holding said locking ring in position.

8. In a vehicle wheel rim, the combination of a fixed rim and a detachable split rim, the latter adapted to seat upon the former, and means for positioning the detachable member and holding it in position, said means comprising inclined portions engaging with corresponding inclines upon the fixed rim, and limiting lateral movement in one direction; a locking ring and a plurality of keepers therefor limiting lateral movement in the opposite direction; and lugs upon said removable member engaging with recesses upon said fixed member limiting circumferential movement.

9. In a vehicle wheel, the combination of a felly, a rim affixed thereto, said rim terminating at one edge in a beveled flange and at the other edge in a beveled taper; a second rim upon the first, comprising a split band terminating at its edges in upwardly projecting flanges and opposite the outer edges of the felly, having downwardly projecting flanges, the one corresponding to the bevel of the fixed rim having an inclined face adapted to contact therewith, and the other corresponding to the taper of the fixed rim having a chamfered bevel adapted to contact with said taper, both in wedging engagement; a locking ring adapted to seat between said taper and the corresponding inclined face upon said removable rim and to promote the said wedging engagement when laterally clamped; means for clamping said locking ring; detachable annular flanges seated upon said removable split rim within its upwardly projecting flanges; means for expanding said rim against said detachable flanges; and a tire seated upon said removable rim and retained thereupon by said detachable flanges.

10. In a vehicle wheel, the combination of a felly, a rim affixed thereto, said rim terminating at one edge in a beveled flange and at the other edge in a beveled taper; a second rim upon the first, comprising a split band terminating at its edges in upwardly projecting flanges, and opposite the outer edges of the felly, having downwardly projecting flanges, the one corresponding to the bevel of the fixed rim having an inclined face adapted to contact therewith, and the other corresponding to the taper of the fixed rim adapted to contact with said taper, both in wedging engagement; a split locking ring adapted to seat against said removable rim and to promote its wedging engagement when laterally clamped; a transverse bolt through said felly, a removable nut thereon, and a keeper retained by said nut adapted to exert pressure upon said locking ring when the said nut is screwed down upon said bolt; detachable annular flanges seated upon said removable rim within its upturned extremities, and means for expanding said rim against said flanges; a tire seated upon said removable rim and retained thereon by said detachable flanges; a valve-stem depending from said tire and extending downwardly through said rims and said felly, a clip upon said valve-stem resting upon the beads of said tire, a nut upon the outer end of said valve-stem, adapted to be screwed up thereupon and to cause said clip to force said beads into engagement with said detachable flanges; and downwardly depending lugs formed upon said removable rim adapted to seat in corresponding depressions in said fixed rim and to prevent relative movement circumferentially therebetween.

11. The combination of a detachable split rim, a resilient tire mounted thereon, a key piece comprising an independent member engaging the ends of said rim and adapted to assist in holding said ends in fixed relation to each other when the rim is in operative position and means for retaining said tire when inflated upon said rim.

12. A detachable rim for a vehicle wheel comprising a transversely split tire-seating member and a key piece engaging the ends of said member, said key piece having an outer face of substantially the same transverse contour as the outer face of the tire-seating member.

13. In a vehicle wheel in combination, a fixed rim, a detachable split rim having ends inclining toward each other outwardly and a wedge shaped key piece adapted to engage said ends.

14. In a vehicle wheel in combination, a fixed rim, a detachable split rim, a tire mounted thereon, a valve-stem for the tire, a clip on the valve-stem, a wedge shaped key-piece fitting between the ends of said detachable rim, and a nut on the valve-stem to engage the key-piece and force it between the ends of the detachable rim.

15. In a vehicle wheel in combination, a fixed rim, a detachable split rim, removable annular tire flanges on said rim, a tire held by said flanges, said tire having a valve-stem, and a clip for the valve stem, a wedge shaped key-piece fitting between the ends of said detachable rim, a nut on the valve-stem to engage the key piece and force it between the ends of the detachable rim and lugs near the ends of said detachable rim to engage sockets in the fixed rim.

16. In a wheel, in combination, a fixed rim having a pair of similarly inclined circumferential faces, a detachable rim having correspondingly inclined faces adapted to engage with the inclined faces of the fixed rim, and an oppositely inclined circumferential face; and a locking ring adapted to engage said oppositely inclined face and the fixed rim.

17. In a wheel, in combination, a fixed rim having a beveled edge, a detachable rim carrying tire-retaining means adapted to seat upon said fixed rim, and means to hold said fixed rim and said detachable rim in assembled relationship comprising a split locking ring having an inclined face adapted to engage with the beveled edge of the fixed rim, the outer diameter of said locking ring exceeding the inner diameter of said detachable rim when said rim and ring are in place, whereby said locking ring prevents the removal of said detachable rim thereover, and means for holding said locking ring in place.

18. In a wheel, in combination, a fixed rim having a beveled edge, a detachable rim carrying tire retaining means adapted to seat upon said fixed rim and means to hold said fixed rim and said detachable rim in assembled relationship comprising a split locking ring having an inner face of substantially the same inclination as that of the beveled rim edge, and having an outer face adapted to seat within a portion of the detachable rim, and means for forcing the locking ring laterally upon the beveled edge of the fixed rim until its outer face seats within the detachable rim.

19. In a wheel, in combination, a wheel member having a beveled seat, a detachable tire carrying rim provided with tire-retaining means and means to hold said wheel member and said rim in assembled relationship comprising a split locking ring seating upon said beveled seat and means for forcing said locking ring laterally over said beveled seat to expand the same into engagement with said detachable rim.

20. In a wheel, in combination, a fixed wheel member having a rim seat at one side thereof, and a beveled locking ring seat at the other side thereof, a detachable tire carrying rim adapted to seat on said rim seat, and having an internal locking ring seat, said rim being provided with tire-retaining means, a split locking ring seating upon said beveled locking ring seat and adapted to engage within the locking ring seat on the detachable rim, and bolts passing transversely through the wheel felly and engaging said locking ring.

21. A supplemental rim for a tire, comprising a channel piece in the form of a broken ring, and a wedging piece engaging the edges of the break in the ring.

22. The combination of a pneumatic tire and a supplemental rim, the said supplemental rim consisting of a broken ring and means interposed between the end portions of the broken ring at the break to hold them apart.

23. In a vehicle wheel, a fixed member, a split detachable tire carrying rim, means for holding said rim in expanded position within a tire while removed from the fixed wheel member, said means permitting the application of the rim to the fixed member while in active position.

24. In a vehicle wheel, a fixed wheel member, a split detachable tire carrying rim, means for expanding said rim while removed from the fixed wheel member, said means permitting the application of the rim to the fixed member while annexed to the rim and remaining so annexed during the use of the rim.

25. In a vehicle wheel, a fixed wheel member, a detachable tire carrying rim seated thereon provided with tire-retaining means, and means to hold said wheel member and said rim in assembled relationship comprising a beveled seat formed on one side of said fixed wheel member, and wedging means seated upon said seat and engaging with said detachable rim to retain the same in position.

26. In a vehicle wheel, in combination, a fixed wheel member, a detachable tire-carrying rim seated on said member, and means to hold said member and said rim in assembled relationship comprising a beveled seat at one side of said fixed wheel member, a beveled seat on said rim, facing the beveled seat on said fixed wheel member, but having an opposite inclination thereto, said rim being provided with tire-retaining means and a wedge shaped to engage said beveled seats and thereby retain said parts.

27. In a vehicle wheel, in combination, a fixed wheel member, a detachable tire carrying rim mounted thereon, a locking-ring, keepers engaging said locking-ring, and bolts for securing said keepers to the fixed wheel member.

28. The combination of an elastic tire and a supplemental rim presenting a channel to receive said tire, the said supplemental rim consisting of a broken ring and means for expanding the broken ring circumferentially to inclose a greater area, said means being such as not to interfere when in position with the placing of the ring fully in operative location on the main rim or felly of the wheel.

29. In a vehicle wheel, a fixed wheel member having a beveled edge, a detachable rim seated on said fixed wheel member, said fixed wheel member and said detachable rim providing a groove therebetween, and means to hold said detachable rim in position upon said fixed wheel member comprising a split locking ring seated in said groove and a member for forcing said locking ring into said groove.

30. In a wheel, in combination, a fixed rim having a raised portion at one side thereof and a depressed portion at the other side thereof, a detachable rim having spaced projecting portions adapted to seat on the raised and depressed portions, respectively, of said fixed rim, a split locking ring adapted to seat with one face contacting against the depressed portion of said fixed rim and another face against one of the projecting portions of said detachable rim, and means to hold said locking ring in position.

31. In a wheel, in combination, a fixed rim having a beveled flange at one side thereof and a beveled depressed portion at the opposite side thereof, a detachable rim provided with a beveled flange seated on the beveled flange of said fixed rim, and a second flange having a portion seated on said fixed rim and a beveled portion inclined in an opposite direction to the bevel of the other flange of said detachable rim, the beveled portion of said second flange and the beveled portion of said fixed rim providing a substantially wedge-shaped groove, a split locking ring having a substantially wedge-shaped portion adapted to seat in said groove, and means adapted to hold said locking ring in place.

EDWIN COUPLAND SHAW.

Witnesses:
 ARTHUR E. DAVISON,
 WALTER K. MEANS.